United States Patent
Myltsev

(10) Patent No.: US 10,496,711 B2
(45) Date of Patent: Dec. 3, 2019

(54) METHOD OF AND SYSTEM FOR PROCESSING A PREFIX ASSOCIATED WITH A SEARCH QUERY

(71) Applicant: YANDEX EUROPE AG, Lucerne (CH)

(72) Inventor: Aleksandr Vladimirovich Myltsev, Moscow (RU)

(73) Assignee: Yandex Europe AG, Lucerne (CH)

( * ) Notice: Subject to any disclaimer, the term of this patent is extended or adjusted under 35 U.S.C. 154(b) by 478 days.

(21) Appl. No.: 15/366,204

(22) Filed: Dec. 1, 2016

(65) Prior Publication Data

US 2017/0185681 A1    Jun. 29, 2017

(30) Foreign Application Priority Data

Dec. 29, 2015    (RU) ................. 2015156695

(51) Int. Cl.

| G06F 16/00 | (2019.01) |
|---|---|
| G06F 16/951 | (2019.01) |
| G06F 16/904 | (2019.01) |
| G06F 16/332 | (2019.01) |

(52) U.S. Cl.
CPC ........ *G06F 16/951* (2019.01); *G06F 16/3322* (2019.01); *G06F 16/904* (2019.01)

(58) Field of Classification Search
CPC ... G06F 16/3322; G06F 16/904; G06F 16/051
See application file for complete search history.

(56) References Cited

U.S. PATENT DOCUMENTS

| 7,984,004 B2 | 7/2011 | Andrew et al. |
| 8,176,069 B2 | 5/2012 | Timm et al. |
| 8,370,329 B2 | 2/2013 | Gutt et al. |
| 8,417,718 B1 | 4/2013 | Finkelstein et al. |
| 8,631,004 B2 | 1/2014 | Mishne et al. |

(Continued)

FOREIGN PATENT DOCUMENTS

| RU | 2546308 C2 | 4/2015 |
| WO | 2015028897 A1 | 3/2015 |

OTHER PUBLICATIONS

Russian Search Report from RU 2015156695 dated Feb. 15, 2017.
International Search Report dated Jan. 14, 2015 in respect of the International Application PCT/IB2014/061857.

*Primary Examiner* — Cheryl Lewis
(74) *Attorney, Agent, or Firm* — BCF LLP

(57) ABSTRACT

A system for and a method of processing a prefix associated with a search query. The method comprises receiving a user input defining a prefix and identifying a list of suggested search queries associated with the prefix. The method determines that (i) a first suggested search query is associated with a first resource and (ii) a first cumulative resource weight based on a first relation between the first suggested search query and the first resource is no less than a second cumulative resource weight based on a second relation between a second suggested search query and a second resource. If so, the method then identifies display data associated with a content item associated with the first resource and transmits, prior to a completed search query associated with the prefix being submitted to the search engine, to the electronic device, the display data along with the list of suggested search queries.

13 Claims, 9 Drawing Sheets

(56) References Cited

U.S. PATENT DOCUMENTS

| | | |
|---|---|---|
| 8,639,715 B1 | 1/2014 | Brinck et al. |
| 8,667,004 B2 | 3/2014 | Sharif et al. |
| 8,676,828 B1 | 3/2014 | Agarwal et al. |
| 8,825,691 B2 | 9/2014 | Boerries et al. |
| 8,990,201 B1* | 3/2015 | Johnston ............. G06F 16/3322 707/736 |
| 8,990,242 B2 | 3/2015 | Mohiuddin et al. |
| 2007/0060114 A1 | 3/2007 | Ramer et al. |
| 2008/0154859 A1 | 6/2008 | Chi et al. |
| 2009/0004374 A1 | 1/2009 | Ito |
| 2009/0032723 A1 | 2/2009 | Fukaya et al. |
| 2009/0043741 A1 | 2/2009 | Kim |
| 2009/0327236 A1 | 12/2009 | Denney et al. |
| 2010/0018564 A1 | 1/2010 | Shinohara |
| 2010/0021158 A1 | 1/2010 | Kanno et al. |
| 2010/0185644 A1 | 7/2010 | Gutt et al. |
| 2010/0211588 A1 | 8/2010 | Jiang et al. |
| 2011/0002263 A1 | 1/2011 | Zhu et al. |
| 2011/0022635 A1 | 1/2011 | Michael et al. |
| 2011/0238656 A1 | 9/2011 | Hood et al. |
| 2012/0024616 A1 | 2/2012 | Birkwald et al. |
| 2012/0047134 A1 | 2/2012 | Hansson et al. |
| 2012/0059838 A1 | 3/2012 | Berntson et al. |
| 2012/0084277 A1 | 4/2012 | Barve et al. |
| 2012/0246165 A1 | 9/2012 | Batraski et al. |
| 2013/0028268 A1 | 1/2013 | Nag |
| 2013/0028270 A1 | 1/2013 | Wu et al. |
| 2013/0028274 A1 | 1/2013 | Samartsev et al. |
| 2013/0282682 A1 | 10/2013 | Batraski et al. |
| 2013/0282702 A1 | 10/2013 | Zhu et al. |
| 2013/0282749 A1 | 10/2013 | Batraski et al. |
| 2014/0172565 A1* | 6/2014 | Alon .................. G06Q 30/0275 705/14.54 |
| 2014/0282136 A1* | 9/2014 | Marantz .................. G06F 16/17 715/764 |
| 2015/0161274 A1* | 6/2015 | Tomko ................ G06F 16/9535 707/722 |
| 2015/0169605 A1* | 6/2015 | Kogan ............. G06F 16/90324 707/737 |

* cited by examiner

| PREFIX | SUGGESTED SEARCH QUERY | RANKING |
|---|---|---|
| LOUV | LOUVRE | 1 |
| LOUV | LOUVRE MUSEUM | 2 |
| LOUV | LOUVRE PARIS | 3 |
| LOUV | LOUVET DE COUVRAY | 4 |
| ... | | |

METHOD OF AND SYSTEM FOR PROCESSING A PREFIX ASSOCIATED WITH A SEARCH QUERY

CROSS-REFERENCE

The present application claims priority to Russian Patent Application No. 2015156695, filed Dec. 29, 2015, entitled "METHOD OF AND SYSTEM FOR PROCESSING A PREFIX ASSOCIATED WITH A SEARCH QUERY", the entirety of which is incorporated herein by reference.

FIELD

The present technology relates to systems and methods for processing a prefix associated with a search query. In particular, the systems and methods aim at identifying display data associated with a resource associated with a suggested search query.

BACKGROUND

There are numerous search engines available to a user. Some of them are considered to be general purpose search engines (such as Yandex™, Google™ and the like). Others are considered to be vertical search engines—i.e. search engines dedicated to a particular topic of search—such as Momondo™ search engine dedicated to searching flights.

Irrespective of which search engine is used, the search engine is generally configured to receive a search query from a user, to perform a search and to return a ranked SERP to the user. Several attempts have been made to improve the design of the SERP in the strive to enable the user to more easily and faster interact with search results—for example in the context of providing a user with one or more suggested search queries while the user is inputting a textual input (which may also be referred to, in some instances, as a prefix) to form a search query.

Approaches aiming at providing content item relating to a suggested search query while the user is inputting the textual input have also been developed. One such approach comprises the method and system depicted in U.S. Pat. No. 8,676,828. The method comprises identifying display data associated with content item for transmission to the user along with one or more completions in response to receiving the user input. The method comprises identifying a suggestion most likely to constitute the request and selecting a content item associated with the suggestion. The method also comprises obtaining a content item associated with a first dominant query that has a quality score that is greater than a threshold.

Even though the above-described method and system may allow providing the user with a content item associated with a suggested search query while the user is inputting a search query, improvements may still be desirable, in particular, improvements aiming at improving (1) accuracy and/or (2) processing speed and/or (3) memory usage in automatically identifying display data associated with a content item associated with a suggested search query upon receipt of a user input.

SUMMARY

It is an object of present technology to provide improvements, in particular improvements aiming at improving (1) accuracy and/or (2) processing speed and/or (3) memory usage in automatically identifying display data associated with a content item associated with a suggested search query upon receipt of a user input.

The present technology arises from an observation made by the inventor(s) that a first cumulative resource weight based on a first relation between a first suggested search query and a first resource may be relied upon to determine that display data associated with a content item associated with the first resource may be selected as display data to be presented to a user along with a list of suggested search query. In some embodiments, the first cumulative resource weight may be calculated based on a parameter reflecting a likelihood of a user accessing the first resource after having been presented the first suggested search query. In some embodiments, the first resource may be associated with a first suggested search query and a second suggested search query. In some embodiments, the first cumulative resource weight may be determined based on a first weight associated with the first resource and a second weight associated with the second resource. The first weight may be reflective of a relation between the first suggested search query and the first resource. The second weight may be reflective of a relation between the second suggested search query and the first resource. In some embodiments, the first cumulative resource weight, the first weight and/or the second weight may be generated prior to the user's input is received thereby allowing, in addition to providing more accurate display data, a faster processing time in identifying the display data to be presented to the user.

Thus, in one aspect, various implementations of the present technology provide computer-implemented method of processing a prefix associated with a search query, the method comprising:
  receiving, from an electronic device, a user input, the user input including at least two characters defining a prefix, the prefix defining at least a portion of a search query which can be submitted to a search engine;
  identifying, by a processor, a list of suggested search queries associated with the prefix, the list of suggested search queries comprising at least a first suggested search query and a second suggested search query, the first suggested search query having been determined as more likely to be selected by the user than the second suggested search query;
  upon determining, by the processor, that (i) the first suggested search query is associated with a first resource and (ii) a first cumulative resource weight based on a first relation between the first suggested search query and the first resource is no less than a second cumulative resource weight based on a second relation between the second suggested search query and a second resource:
    identifying display data associated with a content item associated with the first resource for transmission to the electronic device; and
    transmitting, prior to a completed search query associated with the prefix being submitted to the search engine, to the electronic device, the display data along with the list of suggested search queries.

In some implementations, the list of suggested search queries further comprises a third suggested search query.

In some further implementations, determining, by the processor, that (i) the first suggested search query is associated with the first resource and (ii) the first cumulative resource weight based on the first relation between the first suggested search query and the first resource is no less than the second cumulative resource weight based on the second relation between the second suggested search query and the second resource further comprises:

determining, by the processor, that (i) the third suggested search query is associated with the first resource and (ii) the first cumulative weight based on (a) the first relation between the first suggested search query and the first resource and (b) a third relation between the third suggested search query and the first resource is no less than the second cumulative resource weight based on the second relation between the second suggested search query and the second resource.

In some implementations, the list of suggested search queries further comprises a third suggested search query and wherein the first cumulative weight is further based on a third relation between the third suggested search query and the first resource.

In some further implementations, the first cumulative weight is determined based on a first weight associated with the first resource and a second weight associated with the first resource, the first weight being reflective of the first relation between the first suggested search query and the first resource, the second weight being reflective of a third relation between the third suggested search query and the first resource.

In some implementations, at least one of the first cumulative weight and the second cumulative weight is calculated based on a parameter reflecting a likelihood of a user accessing one of the first resource and the second resource after having been presented one of the first suggested search query and the second suggested search query.

In some further implementations, the parameter is at least one of a number of clicks and a number of views.

In some implementations, the list of suggested search queries further comprises a third suggested search query associated with the first resource and wherein the first cumulative resource weight is further based on a third relation between the third suggested search query and the first resource.

In some further implementations, the list of suggested search queries further comprises a third suggested search query associated with the second resource and wherein the second cumulative resource weight is further based on a third relation between the third suggested search query and the second resource.

In some implementations, determining that (i) the first suggested search query is associated with the first resource and (ii) the first cumulative resource weight based on the first relation between the first suggested search query and the first resource is no less than the second cumulative resource weight based on the second relation between the second suggested search query and the second resource further comprises:

determining that (iii) the first cumulative resource weight is no less than a third cumulative resource weight based on a third relation between a third suggested search query and a third resource.

In some further implementations, determining that the first suggested search query is associated with the first resource comprises determining that the first suggested search query is associated with a content item.

In some implementations, the first relation between the first suggested search query and the first resource is a likelihood of the first resource being selected by a user as a result of submitting the first suggested search query to the search engine.

In some further implementations, the likelihood is based on at least one of a number of clicks and a number of views.

In some implementations, the portion of the search query corresponds to at least a portion of a search term, the search term being comprised in the first suggested search query and the second suggested search query.

In some further implementations, the first suggested search query and the second suggested search query are ordered in the list of the suggested queries based on a likelihood of being selected by a user, the first suggested search query being the most likely to be selected by the user.

In some implementations, transmitting the display data along with the list of suggested search queries further comprises causing the display, on the electronic device, of the display data as a block of information in a suggest list, the suggest list comprising the list of suggested search queries.

In some further implementations, the block of information is caused to be displayed between a search bar and the first suggested search query.

In some implementations, the block of information forms a rich suggest.

In some further implementations, identifying the list of suggested search queries associated with the prefix is based on an analysis of the at least two characters.

In some implementations, determining that the first suggested search query is associated with the first resource comprises at least one of (1) determining whether the first resource is a navigational resource; and (2) determining whether the first suggested search query is a navigational search query.

In some further implementations, the method further comprises:

upon determining, by the processor, that (i) the first suggested search query is not associated with the first resource or (ii) the first cumulative resource weight based on the first relation between the first suggested search query and the first resource is less than the second cumulative resource weight based on the second relation between the second suggested search query and the second resource:
  transmitting, prior to the completed search query associated with the prefix being submitted to the search engine, to the electronic device, the list of suggested search queries without the display data.

In some implementations, prior to identifying the list of suggested search queries associated with the prefix, the method comprises:

generating a first relevancy weight based on analysis of the first relation between the first suggested search query and the first resource, the first relevancy weight being relied upon to generate the first cumulative weight.

In some further implementations, identifying the list of suggested search queries comprises accessing a first database, the first database comprising entries, at least one entry associating the prefix with at least one suggested search query.

In some implementations, the prefix is associated with suggested search queries established as being the most likely to be selected by a user.

In some further implementations, the first database has been generated based on analysis of past search sessions from a plurality of users.

In some implementations, the first cumulative resource weight is determined by accessing a parameter, the parameter establishing, for a first suggested search query, a likelihood of a user accessing the first resource as a result of submitting the first suggested search query.

In some further implementations, the parameter is accessed from a second database, the second database comprising entries, at least one entry associating the first suggested search query, the resource and the parameter.

In some implementations, the association of the first suggested search query, the resource and the parameter has been performed by a machine learning algorithm.

In some further implementations, the content item is retrieved from a third database, the third database comprising entries, each entry associating the content item with the display data, the display data comprising rich suggest content formed from web content extracted from the first resource.

In some implementations, the third database is a rich suggest content database.

In some further implementations, the display data comprises an object card.

In some implementations, the content item is an object card and the display data is a graphical representation of the content item.

In another aspect, various implementations of the present technology provide computer-implemented method of processing a prefix associated with a search query, the method comprising:

receiving, from an electronic device, a user input, the user input including at least two characters defining a prefix, the prefix defining at least a portion of a search query which can be submitted to a search engine;

identifying, by a processor, a list of suggested search queries associated with the prefix, the list of suggested search queries comprising at least a first suggested search query, a second suggested search query and a third suggested search query, the first suggested search query having been determined as more likely to be selected by the user than the second suggested search query and the third suggested search query; and upon determining, by the processor, that (i) the first suggested search query is associated with a content item of a first resource and (ii) the first resource associated with at least the first suggested search query is more likely to be accessed by a user than a second resource associated with at least the second suggested search query and the third suggested search query:

transmitting, prior to a completed search query associated with the prefix being submitted to the search engine, to the electronic device, the content item along with the list of suggested search queries.

In another aspect, various implementations of the present technology provide computer-implemented method of processing a prefix associated with a search query, the method comprising:

receiving, from an electronic device, a user input, the user input including at least two characters defining a prefix, the prefix defining at least a portion of a search query which can be submitted to a search engine;

identifying, by a processor, a list of suggested search queries associated with the prefix, the list of suggested search queries comprising at least a first suggested search query, a second suggested search query and a third suggested search query, the first suggested search query having been determined as more likely to be selected by the user than the second suggested search query and the third suggested search query; and upon determining, by the processor, that (i) the first suggested search query is associated with a content item of a first resource and (ii) the third suggested search query is associated with the content item of the first resource and (iii) the first resource associated with at least the first suggested search query and the third suggested search query is more likely to be accessed by a user than a second resource associated with the second suggested search query:

transmitting, prior to a completed search query associated with the prefix being submitted to the search engine, to the electronic device, the content item along with the list of suggested search queries.

In other aspects, various implementations of the present technology provide a computer-based system, such as, for example, but without being limitative, an electronic device comprising at least one processor and a memory storing program instructions for processing a prefix associated with a search query, the program instructions being executable by one or more processors of the computer-based system to carry out one or more of the above-recited methods.

In the context of the present specification, unless expressly provided otherwise, an "electronic device", an "electronic device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Yet as another example, it should be understood that, the use of the terms "first suggested search query" and "third suggested search query" is not intended to imply, unless specified otherwise, any particular order, type, chronology, hierarchy or ranking (for example) of/between the suggested search queries, nor is their use (by itself) intended imply that any "second suggested search query" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 3 is a diagram of a first database in accordance with an embodiment of the present technology;

Figure 1:
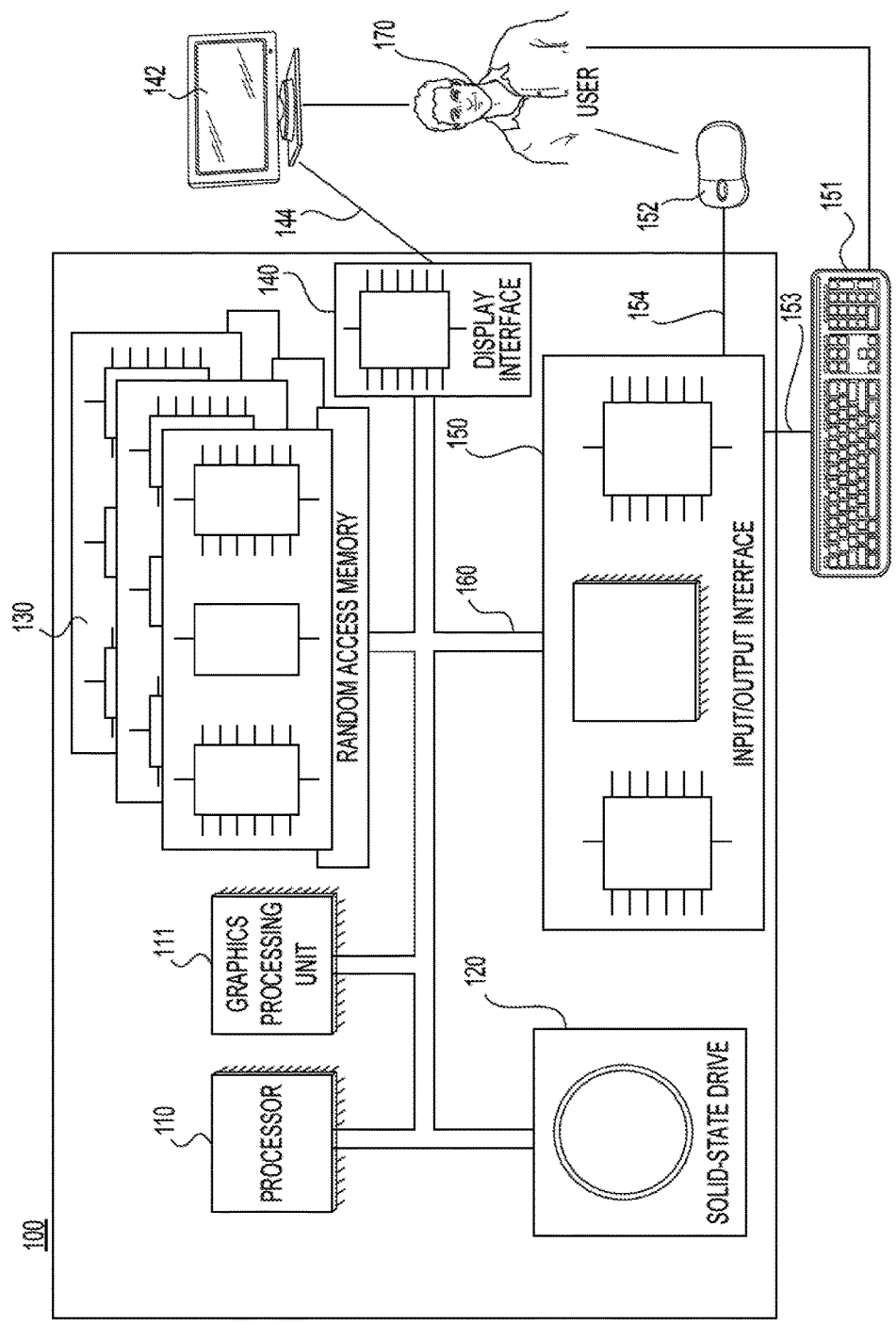
FIG. 1 is a diagram of a computer system suitable for implementing the present technology and/or being used in conjunction with implementations of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a computer system 100 suitable for use with some implementations of the present technology, the computer system 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled. The display interface 140 may be coupled to a monitor 142 (e.g. via an HDMI cable 144) visible to a user 170, and the input/output interface 150 may be coupled to a touchscreen (not shown), a keyboard 151 (e.g. via a USB cable 153) and a mouse 152 (e.g. via a USB cable 154), each of the keyboard 151 and the mouse 152 being operable by the user 170.

According to implementations of the present technology, the solid-state drive 120 stores program instructions suitable for being loaded into the random access memory 130 and executed by the processor 110 and/or the GPU 111 for processing a prefix associated with a search query. For example, the program instructions may be part of a library or an application.

Figure 2:
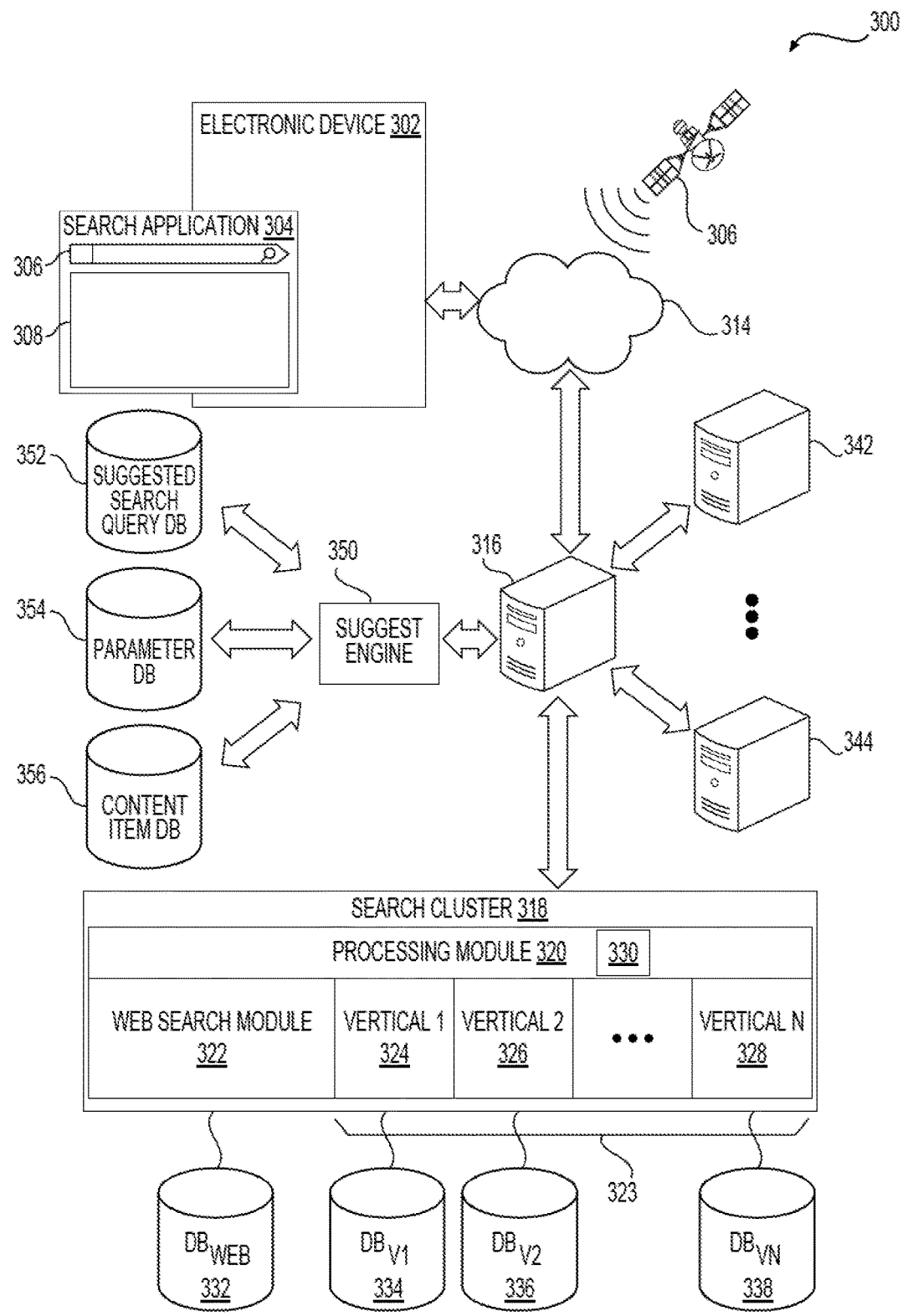
FIG. 2 is a diagram of a networked computing environment in accordance with an embodiment of the present technology.

In FIG. 2, there is shown a networked computing environment 300 suitable for use with some implementations of the present technology. The networked computing environment 300 comprises an electronic device 302 (also referred to as a "client device", an "electronic device" or an "electronic device associated with the user"). The electronic device 302 is typically associated with a user 170 and, as such, can sometimes be referred to as a "client device". It should be noted that the fact that the electronic device 302 is associated with the user 170 does not need to suggest or imply any mode of operation—such as a need to log in, a need to be registered or the like.

The implementation of the electronic device 302 is not particularly limited, but as an example, the electronic device 302 may be implemented as a personal computer (desktops, laptops, netbooks, etc.), a wireless communication device (a cell phone, a smartphone, a tablet and the like), as well as network equipment (a router, a switch, or a gateway). The electronic device 302 comprises hardware and/or software and/or firmware (or a combination thereof), as is known in the art, to execute a search application 304. Generally speaking, the purpose of the search application 304 is to enable the user 170 to execute a search, such as a web search using a search engine hosted on a server 316. To that end, the search application 304 comprises a search query interface 306 and a search results interface 308.

How the search application 304 is implemented is not particularly limited. One example of the search application 304 may be embodied in the user 170 accessing a web site associated with a search engine to access the search application 304. For example, the search application can be accessed by typing in an URL associated with Yandex search engine at www.yandex.ru. It should be expressly understood that the search application 304 can be accessed using any other commercially available or proprietary search engine.

In alternative non-limiting embodiments of the present technology, the search application 304 may be implemented as a browser application on a portable device (such as a wireless communication device). For example (but not limited) to those implementations, where the electronic device 302 is implemented as a portable device, such as for example, Samsung™ Galaxy™ S5, the electronic device may be executing a Yandex browser application. It should be expressly understood that any other commercially available or proprietary browser application can be used for implementing non-limiting embodiments of the present technology.

The electronic device 302 is coupled to a communications network 314 via a communication link (not shown). In some non-limiting embodiments of the present technology, the communications network 314 can be implemented as the Internet. In other embodiments of the present technology, the communications network 314 can be implemented differently, such as any wide-area communications network, local-area communications network, a private communications network and the like.

How the communication link (not shown) is implemented is not particularly limited and will depend on how the electronic device 302 is implemented. Merely as an example and not as a limitation, in those embodiments of the present technology where the electronic device 302 is implemented as a wireless communication device (such as a smart-phone), the communication link (not shown) can be implemented as a wireless communication link (such as but not limited to, a 3G communications network link, a 4G communications network link, a Wireless Fidelity, or WiFi® for short, Bluetooth® and the like). In those examples, where the electronic device 302 is implemented as a notebook computer, the communication link can be either wireless (such as the Wireless Fidelity, or WiFi® for short, Bluetooth® or the like) or wired (such as an Ethernet based connection). In some implementations, the electronic device 302 may be in communication with a GPS satellite 307 transmitting a GPS signal to the electronic device 302.

It should be expressly understood that implementations for the electronic device 302, the communication link (not shown) and the communications network 314 are provided for illustration purposes only. As such, those skilled in the art will easily appreciate other specific implementational details for the electronic device 302, the communication link (not shown) and the communications network 314. As such, by no means, examples provided herein above are meant to limit the scope of the present technology.

Also coupled to the communication network 314 is the server 316. The server 316 can be implemented as a conventional computer server. In an example of an embodiment of the present technology, the server 316 can be implemented as a Dell™ PowerEdge™ Server running the Microsoft™ Windows Server™ operating system. Needless to say, the server 316 can be implemented in any other suitable hardware and/or software and/or firmware or a combination thereof. In the depicted non-limiting embodiment of present technology, the server 316 is a single server. In alternative non-limiting embodiments of the present technology, the functionality of the server 316 may be distributed and may be implemented via multiple servers.

The server 316 is communicatively coupled (or otherwise has access) to a search cluster 318 and to a suggest engine 350. The general purpose of the search cluster 318 is to perform searches in response to user queries inputted via the search query interface 306 and to output search results to be presented to the user using the search results interface 308. The general purpose of the suggest engine 350 is to generate list of suggested search queries and/or identify display data to be transmitted to the electronic device 302 along with the list of suggested search queries. It should be understood that even though the suggest engine 350 is represented as a module standing on its own, it should be understood that the suggest engine 350 may equally be part (partially or completely) of the search cluster 318, for example, but without being limited to, as a sub-module of a processing module 320.

What follows is a description of one non-limiting embodiment of the implementation for the search cluster 318. However, it should be understood that there is a number of alternative non-limiting implementations of the search cluster 318 possible. It should be also expressly understood that in order to simplify the description presented herein below, the configuration of the search cluster 318 has been greatly simplified. It is believed that those skilled in the art will be able to appreciate implementational details for the search cluster 318 and for components thereof that may have been omitted for the purposes of simplification of the description.

Generally speaking the purpose of the search cluster 318 is to (i) conduct searches (details will be explained herein below); (ii) execute analysis of search results and perform ranking of search results; (iii) group results and compile the search result page (SERP) to be outputted to the electronic device 302. How the search cluster 318 is configured to execute searches is not particularly limited. Those skilled in the art will appreciate several ways and means to execute the search using the search cluster 318 and as such, several structural components of the search cluster 318 will only be described at a high level.

In some non-limiting embodiments of the present technology, the processing module 320 can execute several searches, including but not limited to, a general search and/or a vertical search. To that end, the processing module 320 comprises (or has access to) a web search module 322. The web search module 322 is configured to perform general web searches, as is known to those of skill in the art.

In some non-limiting embodiments of the present technology, processing module 320 can execute what is known as a multi-level search. These non-limiting embodiments can be implemented, for example, to increase the speed of the search and to obtain more relevant search results. In some non-limiting embodiments of the present technology, the web search module 322 can be responsible for executing the multi-level search.

To that end, the web search module 322 can execute the top level meta search, as will be discussed in greater detail herein below. The web search module 322 may also have access to a database $DB_{WEB}$ 332, which database $DB_{WEB}$ 332 may be accessed by the web search module 322 to conduct a middle level meta search and a bottom level search. Even though the database $DB_{WEB}$ 332 is depicted as a single entity, in some non-limiting embodiments of the present technology, the database $DB_{WEB}$ 332 can be implemented in a distributed manner, for example as a dedicated database for each of the middle level meta search and the bottom level search.

Also, even though the web search module 322 is depicted as a single entity, in alternative non-limiting embodiments of the present technology the web search module 322 may also be implemented in a distributed manner. For example, each of the distributed implementations of the web search modules 322 may be dedicated to search queries originating from a particular geographical region. In those non-limiting embodiments of the present technology, the processing module 320 may determine a location and/or an IP address associated with the electronic device 302 associated with the user 170 who is submitting the search query. Based on the so-determined location and/or the IP address of the electronic device 302, the processing module 320 may forward the search query to one of the distributed web search modules 322 to perform the top level meta search.

The web search module 322 may also forward a request to the database $DB_{WEB}$ 332 to perform the middle level meta search and the bottom level search. In some non-limiting embodiments of the present technology, the database $DB_{WEB}$ 332 may have a portion (or a separate database) dedicated to the middle level meta search (for example, having a repository of frequently asked questions). The identification of the portion (or a separate database) of the database $DB_{WEB}$ 332 responsible for the middle level meta search may be executed by the database $DB_{WEB}$ 332 based on a so-called "CRC-code". The portion (or a separate database) of the database $DB_{WEB}$ 332 responsible for the middle level meta search may send a given generated query to a portion (or a separate database) of the database $DB_{WEB}$ 332 responsible for the bottom level search.

However, in some non-limiting embodiments of the present technology, where the search query is already saved in cache of the portion (or the separate server) of the database $DB_{WEB}$ 332 as part of the middle level meta search, the step of transmitting the query to the portion (or the separate database) of the database $DB_{WEB}$ 332 responsible for the bottom level search may be omitted altogether. Naturally, in alternative embodiments of the present technology, even if the search query is already saved in cache of the portion (or the separate server) of the database $DB_{WEB}$ 332 as part of the middle level meta search, the step of transmitting the query to the portion (or the separate database) of the database $DB_{WEB}$ 332 responsible for the bottom level search may still be performed.

The processing module 320 may further comprise (or may have access to) a plurality of vertical search modules 323. In the depicted non-limiting embodiment, the plurality of vertical search modules includes a vertical 1 module 324, a vertical 2 module 326 and a vertical N module 328. It should be expressly understood that the number of modules within the plurality of vertical search modules 323 is not meant to be a limitation of embodiments of the present technology.

Merely for the purposes of ease of illustration, it shall be assumed that the vertical 1 module 324 is implemented as a vertical search domain for searching movie showtimes and other information relating to movies and/or movie theaters. As such, it can be said that the vertical 1 module 324 implements a movie showtime search engine or, simply, a movie service.

Furthermore, it shall be assumed that the vertical 2 module 326 is implemented as a vertical search module for searching showtimes other than movie showtimes—e.g., concert showtimes. The vertical 2 module 326 may also be implemented for searching information relating to concerts and/or concert halls. As such, it can be said that the vertical 2 module 326 implements a concert showtime vertical search domain or, simply, a concert service. For the various examples to be provided herein below, it shall be assumed, selectively, that the vertical N search module 328 can implement one of services to be bought (e.g., booking of train tickets, booking of plane tickets . . . ), products to be bought or other services. It should be expressly understood that a number of additional or different services can be implemented as part of the plurality of vertical search modules 323.

In some non-limiting embodiments of the present technology, any given one of the plurality of vertical search modules 323 comprises or has access to one or more databases. These one or more databases host data associated with the particular service implemented by the given one of the plurality of vertical search modules 323.

To that extent, the vertical 1 module 324 has access to a database $DB_{V1}$ 334. Recalling that the vertical 1 module 324 implements a movie service, the database $DB_{V1}$ 334 contains information related to movie showtimes of various movies and the associated movie theaters. The vertical 2 module 326 has access to a database $DB_{V2}$ 336. Recalling that the vertical 2 module 326 implements a concert service, the database $DB_{V2}$ 336 can host a repository of information related to concert showtimes of various concerts and the associated concert halls. By the same token, the vertical N module 328 has access to a database $DB_{VN}$ 338. Recalling that the vertical N module 328 implements selectively one of services to be bought, products to be bought or other services, the database $DB_{VN}$ 338 can host a repository of data associated with the respective services.

Additionally or optionally and, as known to those skilled in the art, the one or more databases (such as the database $DB_{V1}$ 334, $DB_{V2}$ 336 and $DB_{VN}$ 338) may be segregated into one or more separate databases. These segregated databases may be portions of the same physical database (such as the database $DB_{V1}$ 334, database $DB_{V2}$ 336 and database $DB_{VN}$ 338) or may be implemented as separate physical entities. For example, one database within, let's say, the database $DB_{V2}$ 336 could host the most popular/most frequently requested concerts in a given category, while another database within the database $DB_{V2}$ 336 could host all the concerts available within the concert service. Needless to say, the above has been provided as an illustration only and several additional possibilities exist for implementing embodiments of the present technology. Also, as known to those of skill in the art, the search cluster 318 or the server 316 may execute a crawler algorithm—which algorithm causes the search cluster 318 or the server 316 to "crawl" the Internet and index visited web sites into one or more of the databases (such as the database $DB_{V1}$ 334, $DB_{V2}$ 336 and $DB_{VN}$ 338).

Furthermore, it is possible that some of the plurality of vertical search modules 323 may not implement a separate database. This is particularly true, but is not limited to, for example, the vertical N module 328 implementing a product to be bought service. In this example, the vertical N module 328 implementing the product to be bought service may not have a dedicated database, but may rather have access to a service widget repository 330. The service widget repository 330 may be implemented as data repository for one or more widget applications.

Each of the plurality of vertical search modules 323 is configured to perform vertical searches within the respective databases (i.e. database $DB_{V1}$ 334, database $DB_{V2}$ 336 and database $DB_{VN}$ 338). However, it should be noted that the search capabilities of the plurality of vertical search modules 323 are not limited to searching the respective databases (i.e. database $DB_{V1}$ 334, database $DB_{V2}$ 336 and database $DB_{VN}$ 338). As such, the plurality of vertical search modules 323 may perform other searches, as the need may be.

Also, for the purposes of the description presented herein, the term "vertical" (as in vertical search or in vertical search domain) is meant to connote a search performed on a subset of a larger set of data, the subset having been grouped pursuant to an attribute of data. In some embodiments of the present technology, the subset may have been grouped pursuant to one or more themes (e.g., a theme relating to movies, a theme relating to concerts . . . ). For example, to the extent that the vertical 2 module 326 implements a concert service, the vertical 2 module 326 searches a subset (i.e. concerts) of the set of data (i.e. all the data potentially available for searching), the subset of data being stored in the database $DB_{V2}$ 336.

Merely for the purposes of simplifying the description to be presented herein, only a high level description of one approach to executing a search by the search cluster 318 will be presented herein below. It is expected that those skilled in the art will be able to configure the search cluster 318 in any number of known ways without undue experimentation or burden.

As has been mentioned above, in some non-limiting embodiments of the present technology, the processing module 320 can be configured to execute a search in a multi-level meta fashion. In some non-limiting embodiments of the present technology, the processing module 320 includes an http-interface (not depicted) for receiving the search request from the server 316.

When the processing module 320 receives the search query from the server 316, it sends the search query to the web search module 322. As has been alluded to above, in some non-limiting embodiments of the present technology, the sending of the search request to the web search module 322 may be based on the location and/or IP address associated with the electronic device 302, as may be determined by the processing module 320. The web search module 322 performs a search, which in some non-limiting embodiments of the present technology may include a multi-level search. To that extent, the web search module 322 executes some or all of the top level meta search, middle level middle search and the bottom level search.

In some embodiments of the present technology, the processing module 320 may also transmit, in parallel or in sequence, the search query to the plurality of vertical search modules 323 for performing the respective vertical searches. The responses from all the search sources (the plurality of vertical search modules 323 and the web search module 322, which may include the bottom level search, the middle level meta search and the top level meta search) may be received and amalgamated by the processing module 320.

The processing module 320 may then execute a ranking function to generate a ranked search results set. In other words, the processing module 320 ranks the search results by their relevancy to the search query submitted by the user. As those skilled in the art will appreciate, relevancy within this description shall mean how responsive a given search result is to the user query.

Those skilled in the art will appreciate various techniques available for ranking search results. Just as an example and not as a limitation, some of the known techniques for ranking search results by relevancy are based on some or all of: (i) how popular a given search query or a response thereto is in either the plurality of vertical search modules 323 or in the bottom level search (or any other level of the multi level meta search); (ii) how many results have been returned by either the plurality of vertical search modules 323 or in the bottom level search (or any other level of the multi level meta search); (iii) whether the search query contains any determinative terms (such as "movies", "concerts" or the like); (iv) how often a particular search query is typically used with determinative terms by other users; and (v) how often other uses performing a similar search have selected a particular resource or a particular vertical search results when results were presented using the standard SERP.

Within this description, the term "determinative term" shall mean a word or a string of words indicative of the fact that a given search result is more likely to have the most relevant response to the user search query. For example, if the search query contains the term "concert" it can be determined, by the processing module 320, that the vertical 2 module 326, being implemented as a concert service, is likely to be the service that contains the most relevant results to the user query. Needless to say, only a sub set of these, or these combined to others or any combination of other factors may be taken into account when ranking the search results for relevancy. The search cluster 318 may also be configured to transmit ranked search results to the server 316.

The server 316 may also host the suggest engine 350. In some embodiments, the suggest engine 350 may also be hosted on a dedicated server communicatively coupled to the server 316. As previously mentioned, the general purpose of the suggest engine 350 is to generate list of suggested search queries and/or identify display data to be transmitted to the electronic device 302 along with the list of suggested search queries. In order to achieve that purpose, the suggest engine 350 receives, from the electronic device 302, a user input. The user input may be inputted in the search query interface 306 and then transmitted to the suggest engine 350 via the server 316. In some embodiments, the user input includes at least two characters defining a prefix, for example, the three letters "lou". The prefix defines at least a portion of a search query. The prefix is used by the suggest engine 350 to identify a list of suggested search queries associated with the prefix. The list of suggested search queries may comprise a search query for which the user intends to conduct a search. The user may select the search query by conducting a selection action (e.g., clicking, scrolling up or down and pressing an action key, etc.). The search query may then be submitted to the search engine (for example to the search cluster 318 or to the processing module 320).

In an embodiment of the present technology, the suggest engine 350 may be communicatively coupled to a first database 352, a second database 354 and a third database 356. In some embodiments, the first database 352, the second database 354 and the third database 356 may each be hosted on dedicated servers. In other embodiments, one or more of the first database 352, the second database 354 and the third database 356 may be hosted on the server 316. In some embodiments, the first database 352 may be referred to as a suggested search query database, the second database 354 may be referred to as a parameter database and the third database 356 may be referred to as a content item database. More details regarding the first database 352, the second database 354 and the third database 356 will be provided in connection with the description of FIG. 3-5.

In some embodiments, the suggest engine 350 relies on one or more of the first database 352, the second database 354 and the third database 356 to identify display data associated with a content item of a resource. The resource may be a web-resource from which one or more content items are retrieved to generate the display data. In some embodiments, the identification of the display data may rely on one or more cumulative weights which are each associated with a distinct resource. In particular, the one or more cumulative weights may be reflective of a relation between one of the suggested search queries of the list of suggested search queries and a resource. As an example, but without being limited thereto, the relation between the suggested search queries of the list of suggested search queries and a resource may be a user having previously transitioned from one or more search results associated with one of the suggested search queries to the resource. Other variations of relation may also be envisioned without departing from the scope of the present technology.

Once the suggest engine 350 has identified the display data, the display data is transmitted to the electronic device 302, for example, but not limited to, via the server 316. In some embodiments, the display data is transmitted to the electronic device 302 prior to a completed search query associated with the prefix is submitted to the search cluster 318. Broadly speaking, the display data aims at providing the user with augmented data associated with the list of suggested search queries. In some embodiments, the display data may also be referred to as rich suggest. Examples of display data will be further discussed below in connection with the description of FIGS. 6 and 7.

In some embodiments, the suggest engine 350 combined with the first database 352, the second database 354 and/or the third database 356 may allow identifying a most relevant resource and/or content item for a group of common prefix thereby improving accuracy of the content item and/or display data presented to the user while limiting an amount of processing required to present a relevant content item as a result of a received prefix. This aspect will be further discussed below in connection with the description of FIG. 3-5.

The architecture of the networked computing environment 300 of FIG. 2 also comprises a first transaction server 342 and a second transaction server 344. The first transaction server 342 and the second transaction server 344 may be communicatively coupled to the server 316 and/or the electronic device 302 via the communications network 314. In some embodiments, the first transaction server 342 and the second transaction server 344 may each host a transaction platform allowing a user to conduct a service transaction for a specific service such as the buying of a movie ticket or a concert ticket. In some embodiments, the first transaction server 342 and/or the second transaction server 344 may host a multiple service transaction platform as previously detailed in connection with the description of the register database 340. It should be understood that there is a number of alternative non-limiting implementations of the first transaction server 342 and the second transaction server 344. It is believed that those skilled in the art of the present technology will be able to appreciate implementational details for the first transaction server 342 and the second transaction server 344 and for components thereof that may have been omitted for the purposes of simplification of the description.

It should be noted that the above described architecture of the networked computing environment 300 of FIG. 2 has been depicted as an example only. Other non-limiting embodiments for the architecture of FIG. 2 are possible and will become apparent to those of skill in the art having benefit of the present disclosure. For example, the plurality of vertical search modules 323 may be accessed by the server 316 independently from the search cluster 318 and, therefore, may be located on a server other than the search cluster 318.

Turning now to FIG. 3, a diagram of the first database 352 in accordance with an embodiment of the present technology is illustrated. In the illustrated example of FIG. 3 the first database 352 comprises data entries 3522, 3524, 3526 and 3528 organized according to a first column "Prefix", a second column "Suggested Search Query" and a third column "Ranking". As the reader may appreciate, the first database 352 may comprise more or fewer columns and multiple variations for each column may be envisioned without departing from the scope of the present technology. In addition, the data entries 3522, 3524, 3526 and 3528 illustrated in FIG. 3 aim at exemplifying aspects of the present technology and should therefore not be construed as being limitative.

In an embodiment, the first database 352 is accessed by the suggest engine 350 upon receiving a prefix from the electronic device 352. The suggest engine 350 then looks up the first database 352 to identify one of more suggested search queries associated with the corresponding prefix. As an example, if the prefix is "louv", then the suggest engine 350 may determine that the data entries 3522, 3524, 3526 and 3528 correspond to the prefix. As a result, the suggest engine may identify a list of suggested search queries comprising a first suggested search query "LOUVRE", a second suggested search query "LOUVRE MUSEUM", a third suggested search query "LOUVRE PARIS" and a fourth suggested search query "LOUVET DE COUVRAY". In some embodiments, such as the one illustrated at FIG. 3, the suggested search queries may be associated with a ranking. In some embodiments, the ranking may correspond to a likelihood of a first suggested search query being selected as the search query to be submitted compared to a second suggested search query. In some embodiments, the ranking may be generated based on prior user behaviors, such as a number of time a suggested search query has been selected upon being presented to users. Other variations as to how the ranking may also be envisioned without departing from the scope of the present technology. In some embodiments, the list of suggested search queries identified by the suggest engine may, but not necessarily, be ordered based on values of ranking. For example, the first suggested search query "LOUVRE" may be presented before the second suggested search query "LOUVRE MUSEUM" in the list of suggested search queries.

Figure 4:
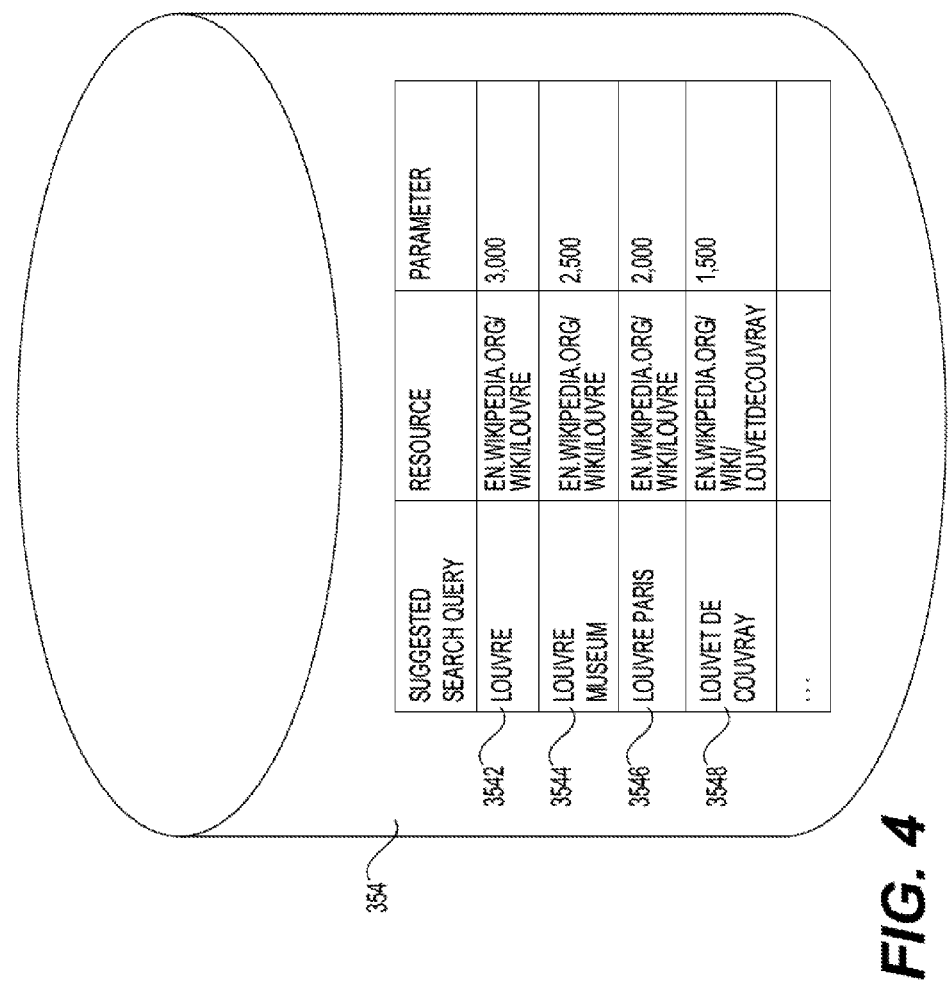
FIG. 4 is a diagram of a second database in accordance with an embodiment of the present technology.

Turning now to FIG. 4, a diagram of the second database 354 in accordance with an embodiment of the present technology is illustrated. In the illustrated example of FIG. 4 the second database 354 comprises data entries 3542, 3544, 3546 and 3548 organized according to a first column "Suggested Search Query", a second column "Resource" and a third column "Parameter". As the reader may appreciate, the second database 354 may comprise more or less columns and multiple variations for each column may be envisioned without departing from the scope of the present technology. In addition, the data entries 3542, 3544, 3546 and 3548 illustrated in FIG. 4 aims at exemplifying aspects of the present technology and should therefore not be construed as being limitative.

In an embodiment, the second database 354 is accessed by the suggest engine 350 in order to determine whether display data is to be displayed on the electronic device 302 along with the list of suggested search queries. In some embodiments, the suggest engine 350 looks up the second database 354 to identify if at least one suggested search query of the list of search queries is associated with a resource. For example, upon looking up the second database 354, the suggest engine may determine that the suggested search query "LOUVRE" is associated with the resource "en.wikipedia.org/wiki/louvre". In this example, the suggested search query "LOUVRE" is also associated with a first resource weight of "3,000" (which may be equally referred to as a parameter). In an example, the first resource weight may reflect a likelihood of a user accessing the resource "en.wikipedia.org/wiki/louvre" after having submitted the search query "LOUVRE". In some embodiments, the first resource weight is based on prior user behaviors and is based on a number of clicks and/or a number of views. Other variations may also be envisioned without departing from the scope of the present technology.

In some embodiments, the suggest engine 350 may rely on the second database 354 to determine a first cumulative resource weight based on a first relation between a first suggested search query and a first resource. Recalling the example set forth in the paragraph below, the first suggested search query may be the suggested search query "LOUVRE", the first resource may be the resource "en.wikipedia.org/wiki/louvre" and the first relation may be defined by the parameter "3,000". In such example, the first cumulative resource weight may be determined by the suggest engine 350 as being "3,000". Pursuing with the same example, the suggest engine 350 may also rely on the second database 354 to determine a second cumulative resource weight based on a second relation between a second suggested search query and a second resource. The second suggested search query may be the suggested search query "LOUVET DE COUVRAY", the second resource may be the resource "en.wikipedia.org/wiki/louvetdecouvray" and the second relation may be defined by the parameter "1,500". In such example, the second cumulative resource weight may be determined by the suggest engine 350 as being "1,500". Still pursuing with the example, the suggest engine 350 may determine that the first cumulative resource weight is superior to (in other words "no less than") the second cumulative resource weight (i.e., 3,000>1,500) and that, as a result, display data associated with the first resource may identified as the display data to be transmitted to the electronic device 302 along with the list of suggested search queries (and not display data associated with the first resource).

In an embodiment, the first cumulative resource weight and/or the second cumulative resource weight may be based on more than one parameter. In particular, the first cumulative resource weight may be determined based on the first resource weight and a second resource weight. For example, the suggest engine 350 may determine that the first resource "en.wikipedia.org/wiki/louvre" is associated with more than one suggested query. In the example of FIG. 4, the suggest engine 350 may determine that the first resource "en.wikipedia.org/wiki/louvre" is also associated with the suggested search query "LOUVRE MUSEUM" and "LOUVRE PARIS". As a result, the suggest engine 350 determines that a relation exists between the suggested search query "LOUVRE MUSEUM" and the first resource and that another relation exists between the suggested search query "LOUVRE PARIS" and the first resource. In such example, the first cumulative resource weight may be determined by adding (1) a first resource weight "3,000" associated with a first suggested search query "LOUVRE", (2) a second resource weight "2,500" associated with a second suggested search query "LOUVRE MUSEUM" and (3) a third resource weight "2,000" associated with a third suggested search query "LOUVRE PARIS". In such example, the first cumulative resource weight is then equal to "7,500". Yet again, the suggest engine 350 may determine that the first cumulative resource weight is superior to (in other words "no less than") the second cumulative resource weight (i.e., 7,500>1,500) and that, as a result, display data associated with the first resource may identified as the display data to be transmitted to the electronic device 302 along with the list of suggested search queries (and not display data associated with the second resource). As the reader may appreciate, the example set forth above is not intended to be limitative and that other format of parameter and/or operations to determine a cumulative resource weight (i.e., not limited to add parameter values) may be envisioned without departing from the scope of the present technology.

In some embodiments, the suggest engine 350 may determine the first cumulative resource weight and/or the second cumulative resource weight by limiting the parameters to be taken into consideration to only the ones that are associated with suggested search queries that are included in the list of suggested search queries. In some embodiments, the selection may be done by combining data entries of the first database 352 with data entries of the second database 354. For example, the suggest engine 350 may first generate the list of suggested search queries based on the data entries of the first database 352 and then use the list of suggested search queries to select the suggested search queries of the second database 354 to be taken into consideration in determining the first cumulative resource weight and/or the second cumulative resource weight.

Figure 6:
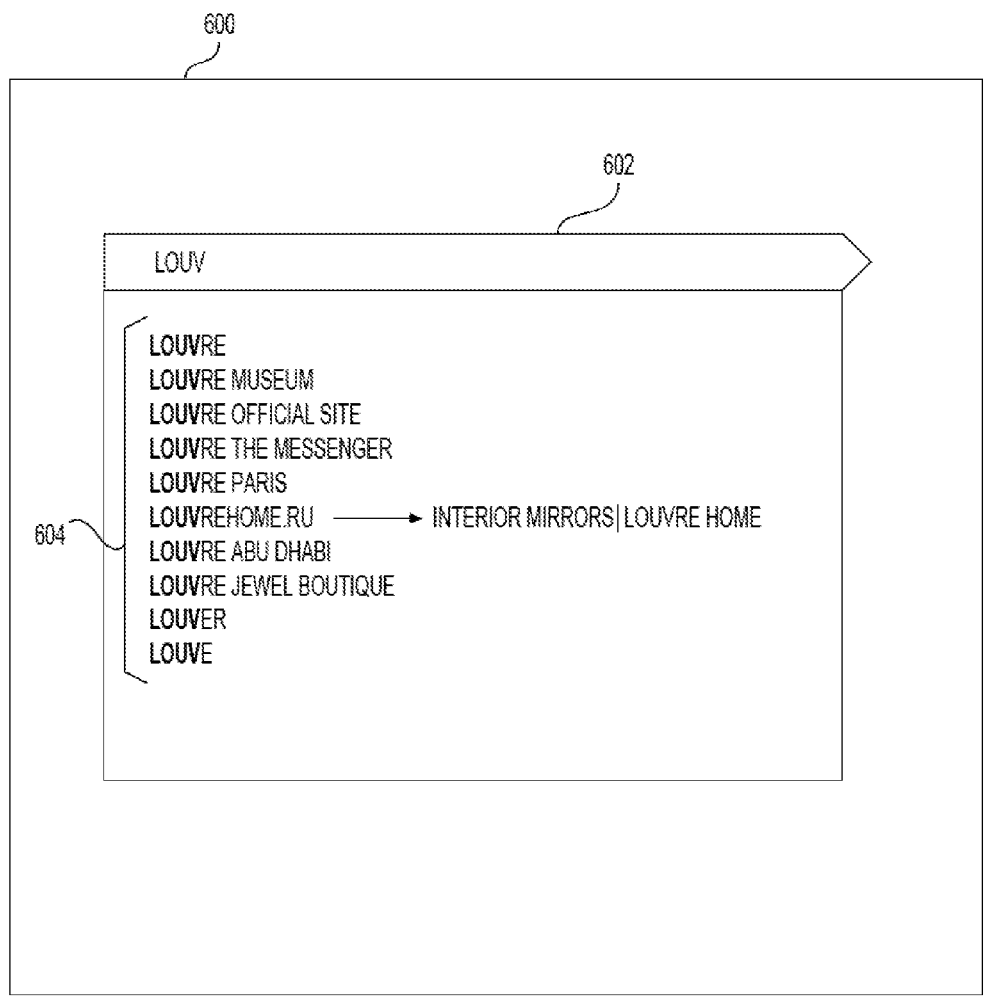
FIG. 6 is a diagram illustrating a list of suggested search results in accordance with an embodiment of the present technology.

In some embodiments, if the suggest engine 350 determines that the second cumulative resource weight is superior to the first cumulative resource weight (i.e. the first cumulative resource weight is less than the second cumulative resource weight) then the suggest engine 350 may transmit the list of suggested search queries to the electronic device 302 without any display data (for example, as illustrated in FIG. 6). In some other embodiments, if the suggest engine 350 determines that the second cumulative resource weight is superior to the first cumulative resource weight (i.e. the first cumulative resource weight is less than the second cumulative resource weight) then the suggest engine 350 may identify the display data associated with a second resource. For example, the second cumulative resource weight determined based on the resource weight associated with the suggested search query "LOUVET DE COUVRAY" may be "1,500". If in an hypothetical example the first cumulative resource weight is less than the second cumulative resource weight, then the suggest engine 30 may determine that the display data associated with the suggested search query "LOUVET DE COUVRAY" is to be transmitted to the electronic device 302 along with the list of suggested search queries.

In some embodiments, the data entries 3452, 3544, 3546 and 3548 may be generated before prior to identifying the list of suggested search queries associated with the prefix. In such embodiments, the data entries 3452, 3544, 3546 and 3548 may be generated before the electronic device 302 initiates a connection with the server 316, for example via a machine learning algorithm based on data reflecting past user behaviors.

In yet some embodiments, the second database 354 may comprise an additional column reflecting a category of a resource. In the example of FIG. 4, a category data may take the form of an indication reflecting a type of resource. As an example, but without being limited thereto, the resource "en.wikipedia.org/wiki/louvre" may be associated with a category "wild". Multiple types of categories may be envisioned without departing from the scope of the present technology. In addition, in some embodiments, the category may also comprise an indication as to whether the resource is a navigational resource (i.e., the user may click to access the content of the resource). In some other embodiments, the category is associated with the suggested search query, for example to indicate that a given suggested search query is a navigational search query (i.e., the user may access a resource by clicking on at least one of the results associated with the suggested search query when submitted to the search cluster 318). In some other embodiments, the category may be directly associated with the prefix of the first database 352. Other variations may also be envisioned without departing from the scope of the present technology.

In some embodiments, the category of the resource and/or the category of the suggested search query may be relied upon to determine whether display data are available and/or whether they should be transmitted to the electronic device 302 along with the list of suggested search queries. For example, the suggest engine 350 may determine that even though the first cumulative resource weight associated with the first suggested search query is no less than the second cumulative resource weight associated with the second suggested search query, the display data associated with the resource associated with the first suggested search query shall not be transmitted as the resource is not associated with an acceptable category. For example, the resource may be classified as a "non-wiki" resource and as such, the suggest engine 350 determines that the resource may not be relied upon to generate and/or transmit display data associated with the resource. In some embodiments, the category may simply establish whether the display data associated with a resource exists and/or whether the display data is to be used for transmission along with a list of suggested search queries. Other variations may also be envisioned without departing from the scope of the present technology.

Figure 5:
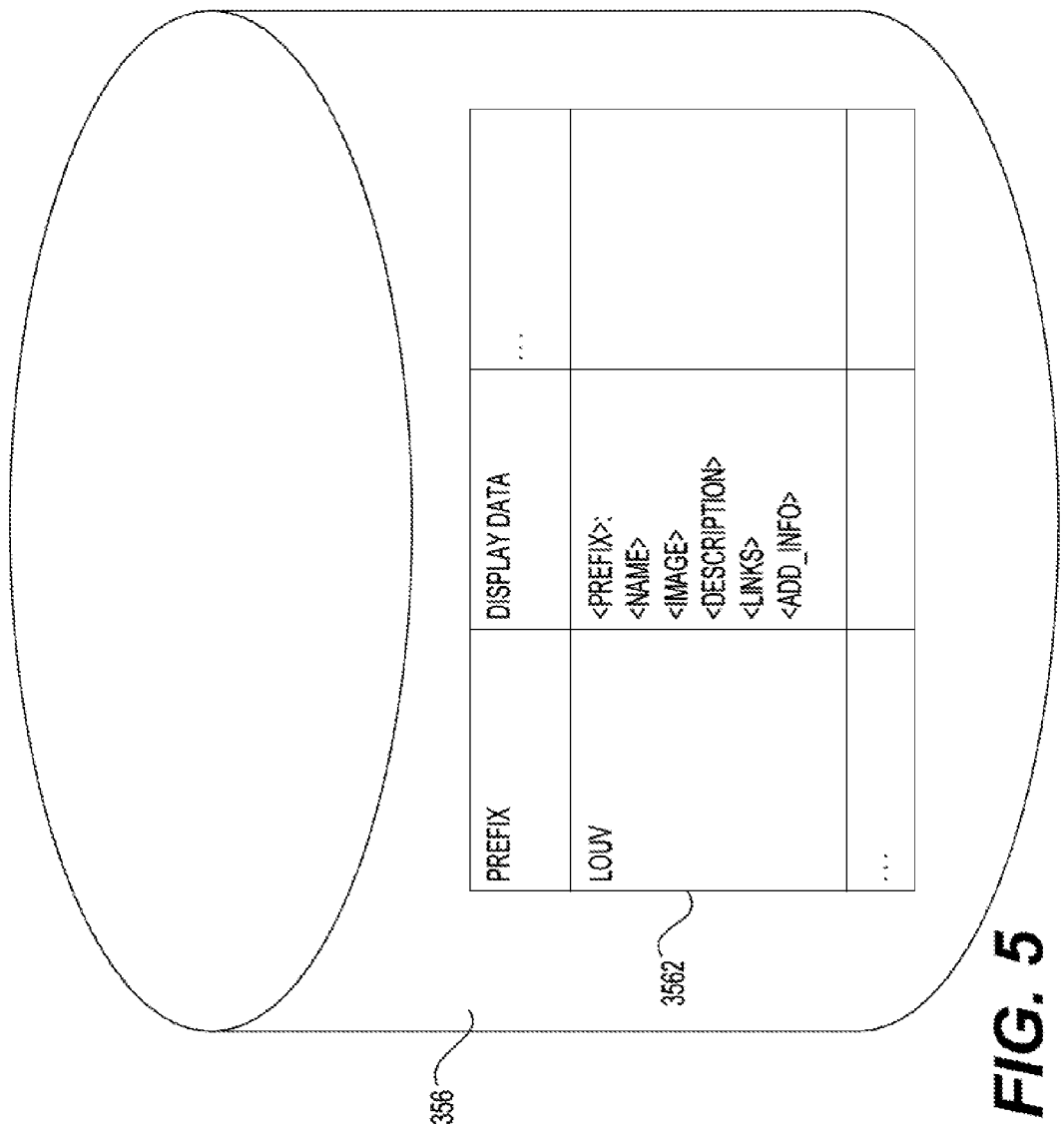
FIG. 5 is a diagram of a third database in accordance with an embodiment of the present technology.

Turning now to FIG. 5, a diagram of the third database 356 in accordance with an embodiment of the present technology is illustrated. In the illustrated example of FIG. 5 the third database 354 comprises data entries 3562 organized according to a first column "Prefix", and a second column "Display Data". As the reader may appreciate, the third database 356 may comprise more or less columns and multiple variations for each column may be envisioned without departing from the scope of the present technology. For example, the second column may be divided into multiple columns each containing a given field and/or storing a given type of data. In addition, the data entries 3562 illustrated in FIG. 5 aims at exemplifying aspects of the present technology and should therefore not be construed as being limitative. In some embodiments, the third database 356 is populated prior to the suggest engine processing a prefix. For example, the third database 356 may be populated by crawling web pages from which content may be extracted to populate the second column "Display Data". For example, a web resource "en.wikipedia.org/wiki/louvre" may be accessed to extract various data such as, but not limited to, a name, image(s), a description, a web link and/or additional information. In some embodiments, the "Display Data" may comprise a category field allowing to identify a category of the "Display Data" and/or a category of a resource from which the "Display Data" was extracted. For example, the "Display Data" generated from the web resource "en.wikipedia.org/wiki/louvre" may be associated with a category "wild". The category may then be used by the suggest engine 350 to determine whether the "Display Data" is to be shown and/or how it is to be formatted/ presented to the user. In some embodiments, the category may be indicative that the "Display Data" and/or associated content item should be preferred over another "Display Data" and/or associated content item by the suggest engine 350. In some embodiments, the category may be indicative that the "Display Data" and/or associated content item qualified as a rich suggest content and may therefore be presented to the user.

The data of the "Display Data" may be extracted according to known techniques which may become apparent to the person skilled in the art of the present technology. Further, types of data and/or categories of data extracted to populate the third database 356 may be used and this aspect is therefore not limitative. Multiple variations may become apparent to the person skilled in the art of the present technology.

In some embodiments, the extracted data may define "rich suggest" that may then be accessed from the third database 356. In some embodiments, display data may define a content item. For example, a content item may comprise some or all of the "Display Data" associated with a given prefix. For example, the content item for "LOUVRE MUSEUM" may comprise, a name, an image, a description and a web link. The image may a preferred and/or representative image associated with the prefix. In some embodiments, the content item does not comprise the display data but rather a pointer towards some or all of the "Display Data" associated with a given prefix. Broadly speaking, the content item may be defined as being associated with display data meaning that it comprises and/or may have access to some or all the display data.

In some embodiments, such as the example illustrated at FIG. 5, a given prefix is associated with a set of "Display Data" (for example, a name, an image, a description . . . ). In such example, a column "Prefix" may define an entry of a dictionary of content item (and/or rich suggest as the case may be). For example, a given prefix may only be associated with a single set of "Display Data". Such an embodiment may allow for fast retrieving of the content item and/or display data and/or rich suggest once a prefix has been selected by the suggest engine 350. Other variations may however also be envisioned, such as an alternative embodiment wherein a suggested search query is associated with a given set of "Display Data".

Also, in some embodiments, the third database 356 may also be referred to as a rich suggest content database. In some embodiments, a set of "Display Data" may partially or completely define an object card. In some embodiments, a content item is defined as being an object card and the display data may be defined as a graphical representation of the content item. For example, the content item may be an object card comprising textual information and the display data corresponds to an image associated with the object card (i.e., the content item). Other variations and/or combinations may also be envisioned without departing from the scope of the present technology.

Turning now to FIG. 6, a search engine interface 600 is illustrated. The search engine interface 600 comprises an input window 602 (equally referred to as a search bar) allowing the user 170 to enter a search query and/or a prefix for cases where the user 170 intents to solely enter a prefix. In the example of FIG. 6, the user 170 has input a chain of characters "LOUV" which may define a prefix "LOUV". The search engine interface 600 also comprises a list of suggested queries 604 which has been generated based on the prefix "LOUV".

Figure 7:
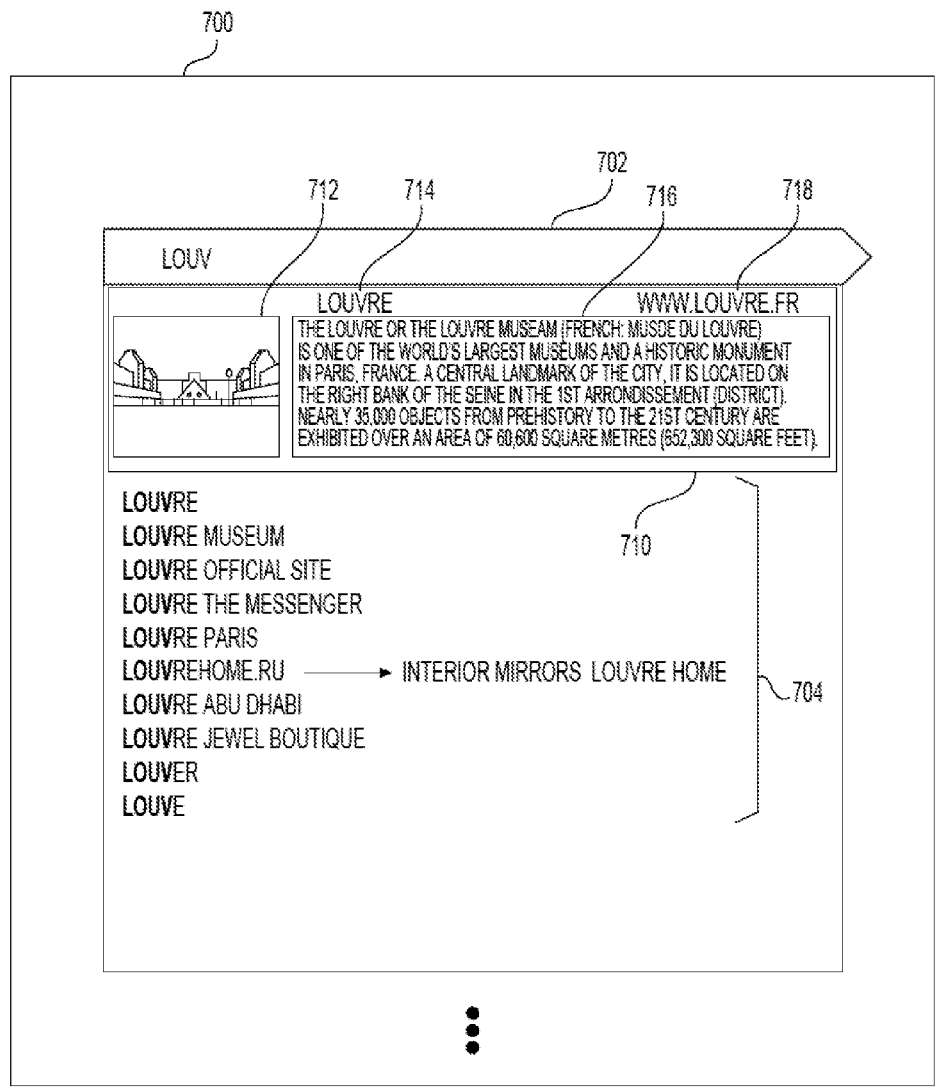
FIG. 7 is a diagram illustrating display data along with a list of suggested search results in accordance with an embodiment of the present technology.

Turning now to FIG. 7, a search engine interface 700 is illustrated. The search engine interface 700 comprises an input window 702 (equally referred to as a search bar) allowing the user 170 to enter a search query and/or a prefix for cases where the user 170 intents to solely enter a prefix. In the example of FIG. 7, the user 170 has input a chain of characters "LOUV" which may define a prefix "LOUV". The search engine interface 700 also comprises a list of suggested queries 704 which has been generated based on the prefix "LOUV". The search engine interface 700 further comprises display data 710 located between the input window 702 and the list of suggested queries 704. The display data 710 may also be referred to as a content item, an object card, a rich suggest content item and/or a block of information. In the example of FIG. 7, the display data 710 comprises an image 712, a name 714 (i.e., "LOUVRE"), a textual description 716 and a link to a web resource 718 (i.e., www.louvre.fr). In the illustrated embodiment, the display data 710 defining a block of information is displayed between the input window 702 and the list of suggested queries 704.

As the reader may appreciate, FIG. 7 is provided as an example and should not be construed as being limitative. Multiple variant, in particular with respect to (1) the format of the display data, (2) the content of the display data and/or (3) the location of the display data on the search engine interface, may be envisioned without departing from the scope of the present technology.

Given the architecture described with reference to FIG. 2-5 and the examples of FIGS. 6 and 7, it is possible to execute a method of processing a prefix associated with a search query. The method can be, for example, but without being limitative, conveniently executable at the server 316. To that extent, the server 316 may comprise non-transitory computer usable information storage medium that enables the server 316 to execute the method in accordance with embodiments of the present technology. For the sake of an example, the methods 800 and 900 will be illustrated as executed on the server 316.

Figure 8:
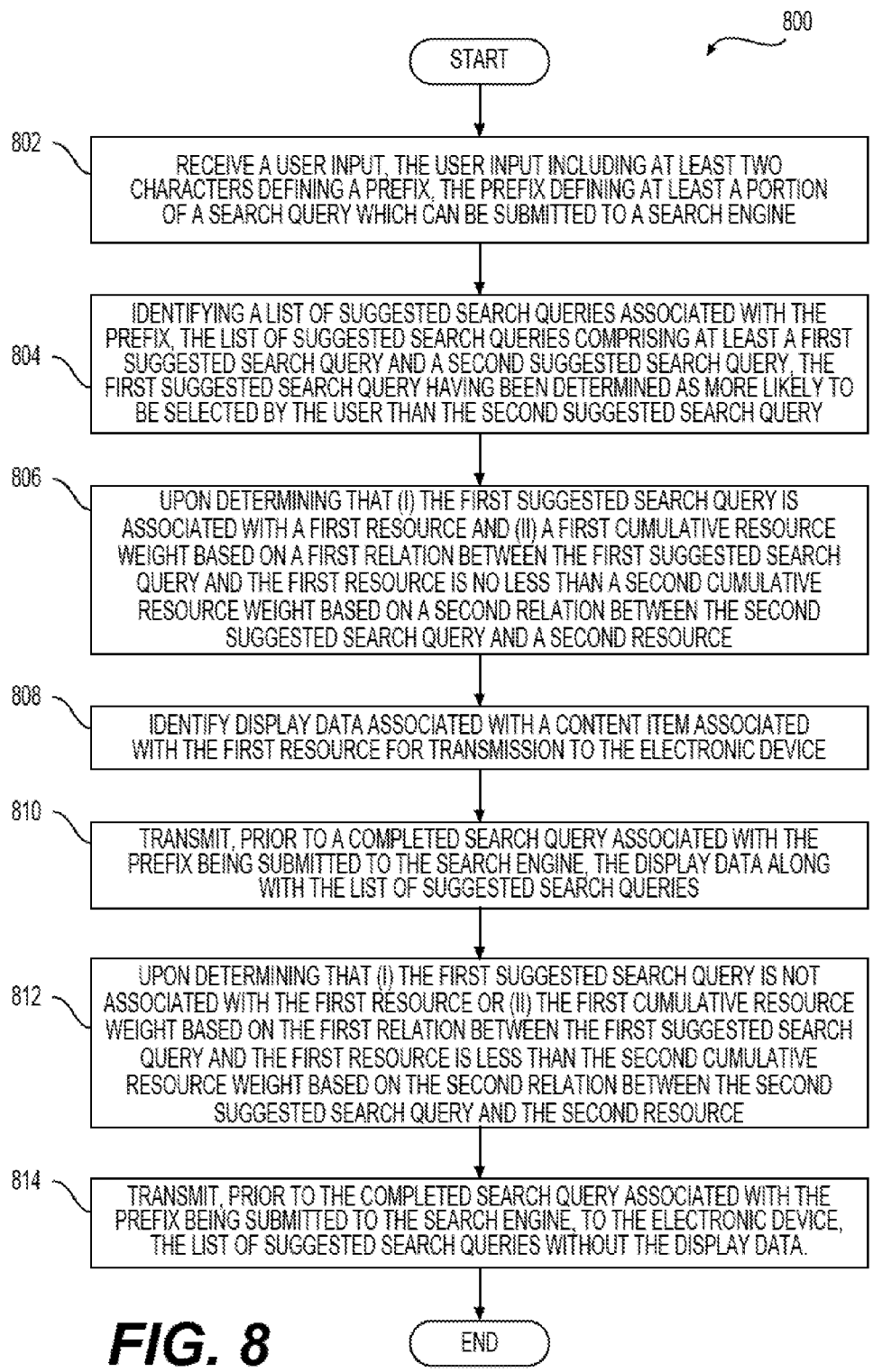
FIG. 8 is a flowchart illustrating a computer-implemented method implementing embodiments of the present technology.

More specifically, FIG. 8 shows a flowchart illustrating a computer-implemented method of 800 processing a prefix associated with a search query received from the electronic device 302 associated with a user. The method 800 starts with step 802 by receiving, from an electronic device, a user input, the user input including at least two characters defining a prefix, the prefix defining at least a portion of a search query which can be submitted to a search engine.

Then, at a step 804, the method 800 identifies, by a processor, a list of suggested search queries associated with the prefix, the list of suggested search queries comprising at least a first suggested search query and a second suggested search query, the first suggested search query having been determined as more likely to be selected by the user than the second suggested search query. In some embodiments, the portion of the search query corresponds to at least a portion of a search term, the search term being comprised in the first suggested search query and the second suggested search query. In some embodiments, the list of suggested search queries further comprises a third suggested search query. In some embodiments, the list of suggested search queries further comprises a third suggested search query and the first cumulative weight is further based on a third relation between the third suggested search query and the first resource.

In some embodiments, the list of suggested search queries further comprises a third suggested search query associated with the first resource and the first cumulative resource weight is further based on a third relation between the third suggested search query and the first resource. In some embodiments, the list of suggested search queries further comprises a third suggested search query associated with the second resource and the second cumulative resource weight is further based on a third relation between the third suggested search query and the second resource.

In some embodiments, the first suggested search query and the second suggested search query are ordered in the list of the suggested queries based on a likelihood of being selected by a user, the first suggested search query being the most likely to be selected by the user.

In some embodiment, prior to the step 804, the method 800 executes generating a first relevancy weight based on analysis of the first relation between the first suggested search query and the first resource, the first relevancy weight being relied upon to generate the first cumulative weight.

At a step 806, the method 800 determines, by the processor, whether (i) the first suggested search query is associated with a first resource and (ii) a first cumulative resource weight based on a first relation between the first suggested search query and the first resource is no less than a second cumulative resource weight based on a second relation between the second suggested search query and a second resource.

In some embodiments, the data entries 3542, 3544, 3546 and 3548 may be generated before prior to identifying the list of suggested search queries associated with the prefix. In such embodiments, the data entries 3542, 3544, 3546 and 3548 may be generated before the electronic device 302 initiates a connection with the server 316, for example via a machine learning algorithm based on data reflecting past user behaviors.

In some embodiments, the step 806 further comprises determining that (iii) the first cumulative resource weight is no less than a third cumulative resource weight based on a third relation between a third suggested search query and a third resource.

In some embodiments, determining that the first suggested search query is associated with the first resource comprises determining that the first suggested search query is associated with a content item. In some embodiments, the first relation between the first suggested search query and the first resource is a likelihood of the first resource being selected by a user as a result of submitting the first suggested search query to the search engine. In some embodiments, the likelihood is based on at least one of a number of clicks and a number of views. In some embodiments, identifying the list of suggested search queries associated with the prefix is based on an analysis of the at least two characters.

In some embodiments, the first cumulative weight is determined based on a first weight associated with the first resource and a second weight associated with the first resource, the first weight being reflective of the first relation between the first suggested search query and the first resource, the second weight being reflective of a third relation between the third suggested search query and the first resource. In some embodiments, at least one of the first cumulative weight and the second cumulative weight is calculated based on a parameter reflecting a likelihood of a user accessing one of the first resource and the second resource after having been presented one of the first suggested search query and the second suggested search query. In some embodiments, the parameter is at least one of a number of clicks and a number of views.

In some embodiments, the first cumulative resource weight is determined by accessing a parameter, the parameter establishing, for a first suggested search query, a likelihood of a user accessing the first resource as a result of submitting the first suggested search query. In some embodiments, the parameter is accessed from a second database, the second database comprising entries, at least one entry associating the first suggested search query, the resource and the parameter. In some embodiments, the association of the first suggested search query, the resource and the parameter has been performed by a machine learning algorithm.

In some embodiments, determining that the first suggested search query is associated with the first resource comprises at least one of (1) determining whether the first resource is a navigational resource; and (2) determining whether the first suggested search query is a navigational search query. In some embodiments, identifying the list of suggested search queries comprises accessing a first database, the first database comprising entries, at least one entry associating the prefix with at least one suggested search query. In some embodiments, the first database has been generated based on analysis of past search sessions from a plurality of users.

In some embodiments, the prefix is associated with suggested search queries established as being the most likely to be selected by a user.

If the conditions (i) and (ii) are met, then the method 800 executes steps 808 and 810. At the step 808, the method 800 identifies display data associated with a content item associated with the first resource for transmission to the electronic device. At the step 810, the method 800 transmits, prior to a completed search query associated with the prefix being submitted to the search engine, to the electronic device, the display data along with the list of suggested search queries.

In some embodiments, the method 800 may also comprise steps 812 and 814. At the step 812, the method 800 determines, by the processor, that (i) the first suggested search query is not associated with the first resource or (ii) the first cumulative resource weight based on the first relation between the first suggested search query and the first resource is less than the second cumulative resource weight based on the second relation between the second suggested search query and the second resource. If the conditions (i) or (ii) are met, then the method 800 executes the step 814. At the step 814, the method transmits, prior to the completed search query associated with the prefix being submitted to the search engine, to the electronic device, the list of suggested search queries without the display data.

In some embodiments, transmitting the display data along with the list of suggested search queries further comprises causing the display, on the electronic device, of the display data in a vicinity of the first suggested search query. In some embodiments, transmitting the display data along with the list of suggested search queries further comprises causing the display, on the electronic device, of the display data as a block of information in a suggest list, the suggest list comprising the list of suggested search queries. In some embodiments, the block of information is caused to be displayed between a search bar and the first suggested search query.

In some embodiment, the block of information forms a rich suggest. In some embodiments, the content item is retrieved from a third database, the third database comprising entries, each entry associating the content item with the display data, the display data comprising rich suggest content formed from web content extracted from the first resource. In some embodiments, the third database is a rich suggest content database. In some embodiments, the display data comprises an object card. In some embodiments, the content item is an object card and the display data is a graphical representation of the content item.

Figure 9:
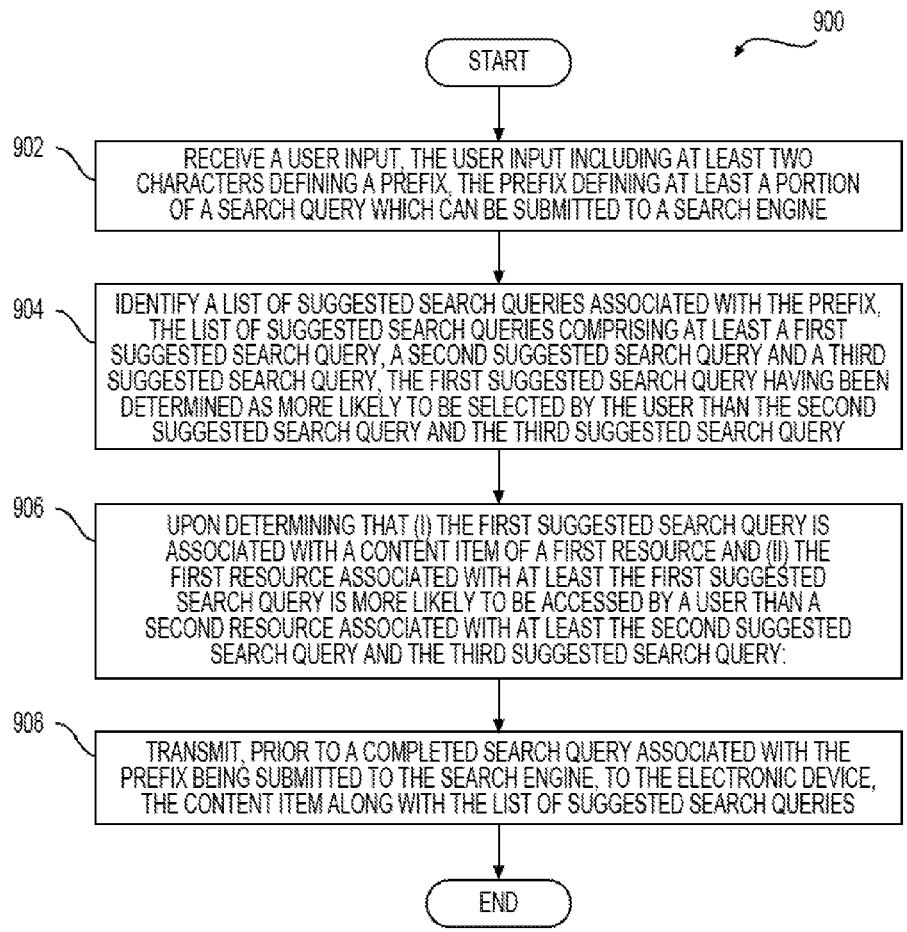
FIG. 9 is a flowchart illustrating another computer-implemented method implementing embodiments of the present technology.

FIG. 9 shows a flowchart illustrating another computer-implemented method of 900 processing a prefix associated with a search query received from the electronic device 302 associated with a user. The method 900 starts with step 902 by receiving, from an electronic device, a user input, the user input including at least two characters defining a prefix, the prefix defining at least a portion of a search query which can be submitted to a search engine.

Then, at a step 904, the method 900 executes identifying, by a processor, a list of suggested search queries associated with the prefix, the list of suggested search queries comprising at least a first suggested search query, a second suggested search query and a third suggested search query, the first suggested search query having been determined as more likely to be selected by the user than the second suggested search query and the third suggested search query.

Then, at a step 906, the method 900 determines whether (i) the first suggested search query is associated with a content item of a first resource and (ii) the first resource associated with at least the first suggested search query is more likely to be accessed by a user than a second resource associated with at least the second suggested search query and the third suggested search query. If conditions (i) and (ii) are met, then the method 900 proceeds to step 908 by transmitting, prior to a completed search query associated with the prefix being submitted to the search engine, to the electronic device, the content item along with the list of suggested search queries.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

As such, the methods and systems implemented in accordance with some non-limiting embodiments of the present technology can be represented as follows, presented in numbered clauses.

[Clause 1] A computer-implemented method, the method comprising:
 receiving, from an electronic device (302), a user input, the user input including at least two characters defining a prefix, the prefix defining at least a portion of a search query which can be submitted to a search engine;
 identifying, by a processor (110), a list of suggested search queries associated with the prefix, the list of suggested search queries comprising at least a first suggested search query and a second suggested search query, the first suggested search query having been determined as more likely to be selected by the user than the second suggested search query;
 upon determining, by the processor (110), that (i) the first suggested search query is associated with a first resource and (ii) a first cumulative resource weight based on a first relation between the first suggested search query and the first resource is no less than a second cumulative resource weight based on a second relation between the second suggested search query and a second resource:
  identifying display data associated with a content item associated with the first resource for transmission to the electronic device (302); and
  transmitting, prior to a completed search query associated with the prefix being submitted to the search engine, to the electronic device (302), the display data along with the list of suggested search queries.

[Clause 2] The method of clause 1, wherein the list of suggested search queries further comprises a third suggested search query.

[Clause 3] The method of any one of the preceding clauses, wherein determining, by the processor (110), that (i) the first suggested search query is associated with the first resource and (ii) the first cumulative resource weight based on the first relation between the first suggested search query and the first resource is no less than the second cumulative resource weight based on the second relation between the second suggested search query and the second resource further comprises:
 determining, by the processor (110), that (i) the third suggested search query is associated with the first resource and (ii) the first cumulative weight based on (a) the first relation between the first suggested search query and the first resource and (b) a third relation between the third suggested search query and the first resource is no less than the second cumulative resource weight based on the second relation between the second suggested search query and the second resource.

[Clause 4] The method of any one of the preceding clauses, wherein the list of suggested search queries further comprises a third suggested search query and wherein the first cumulative weight is further based on a third relation between the third suggested search query and the first resource.

[Clause 5] The method of any one of the preceding clauses, wherein the first cumulative weight is determined based on a first weight associated with the first resource and a second weight associated with the first resource, the first weight being reflective of the first relation between the first suggested search query and the first resource, the second weight being reflective of a third relation between the third suggested search query and the first resource.

[Clause 6] The method of any one of the preceding clauses, wherein at least one of the first cumulative weight and the second cumulative weight is calculated based on a parameter reflecting a likelihood of a user accessing one of the first resource and the second resource after having been presented one of the first suggested search query and the second suggested search query.

[Clause 7] The method of clause 6, wherein the parameter is at least one of a number of clicks and a number of views.

[Clause 8] The method of any one of the preceding clauses, wherein the list of suggested search queries further comprises a third suggested search query associated with the first resource and wherein the first cumulative resource weight is further based on a third relation between the third suggested search query and the first resource.

[Clause 9] The method of any one of the preceding clauses, wherein the list of suggested search queries further comprises a third suggested search query associated with the second resource and wherein the second cumulative resource weight is further based on a third relation between the third suggested search query and the second resource.

[Clause 10] The method of any one of the preceding clauses, wherein determining that (i) the first suggested search query is associated with the first resource and (ii) the first cumulative resource weight based on the first relation between the first suggested search query and the first resource is no less than the second cumulative resource weight based on the second relation between the second suggested search query and the second resource further comprises:

determining that (iii) the first cumulative resource weight is no less than a third cumulative resource weight based on a third relation between a third suggested search query and a third resource.

[Clause 11] The method of any one of the preceding clauses, wherein determining that the first suggested search query is associated with the first resource comprises determining that the first suggested search query is associated with a content item.

[Clause 12] The method of any one of the preceding clauses, wherein the first relation between the first suggested search query and the first resource is a likelihood of the first resource being selected by a user as a result of submitting the first suggested search query to the search engine.

[Clause 13] The method of any one of the preceding clauses, wherein the likelihood is based on at least one of a number of clicks and a number of views.

[Clause 14] The method of any one of the preceding clauses, wherein the portion of the search query corresponds to at least a portion of a search term, the search term being comprised in the first suggested search query and the second suggested search query.

[Clause 15] The method of any one of the preceding clauses, wherein the first suggested search query and the second suggested search query are ordered in the list of the suggested queries based on a likelihood of being selected by a user, the first suggested search query being the most likely to be selected by the user.

[Clause 16] The method of any one of the preceding clauses, wherein transmitting the display data along with the list of suggested search queries further comprises causing the display, on the electronic device (302), of the display data in a vicinity of the first suggested search query.

[Clause 17] The method of any one of the preceding clauses, wherein transmitting the display data along with the list of suggested search queries further comprises causing the display, on the electronic device (302), of the display data as a block of information in a suggest list, the suggest list comprising the list of suggested search queries.

[Clause 18] The method of clause 17, wherein the block of information is caused to be displayed between a search bar and the first suggested search query.

[Clause 19] The method of clause 18, wherein the block of information forms a rich suggest.

[Clause 20] The method of any one of the preceding clauses, wherein identifying the list of suggested search queries associated with the prefix is based on an analysis of the at least two characters.

[Clause 21] The method of any one of the preceding clauses, wherein determining that the first suggested search query is associated with the first resource comprises at least one of (1) determining whether the first resource is a navigational resource; and (2) determining whether the first suggested search query is a navigational search query.

[Clause 22] The method of any one of the preceding clauses, wherein the method further comprises:

upon determining, by the processor (110), that (i) the first suggested search query is not associated with the first resource or (ii) the first cumulative resource weight based on the first relation between the first suggested search query and the first resource is less than the second cumulative resource weight based on the second relation between the second suggested search query and the second resource:

transmitting, prior to the completed search query associated with the prefix being submitted to the search engine, to the electronic device (302), the list of suggested search queries without the display data.

[Clause 23] The method of any one of the preceding clauses, wherein, prior to identifying the list of suggested search queries associated with the prefix, the method comprises:

generating a first relevancy weight based on analysis of the first relation between the first suggested search query and the first resource, the first relevancy weight being relied upon to generate the first cumulative weight.

[Clause 24] The method of any one of the preceding clauses, wherein identifying the list of suggested search queries comprises accessing a first database (352), the first database (352) comprising entries, at least one entry associating the prefix with at least one suggested search query.

[Clause 25] The method of clause 24, wherein the prefix is associated with suggested search queries established as being the most likely to be selected by a user.

[Clause 26] The method of any one of the preceding clauses, wherein the first database (352) has been generated based on analysis of past search sessions from a plurality of users.

[Clause 27] The method of any one of the preceding clauses, wherein the first cumulative resource weight is determined by accessing a parameter, the parameter establishing, for a first suggested search query, a likelihood of a user accessing the first resource as a result of submitting the first suggested search query.

[Clause 28] The method of clause 27, wherein the parameter is accessed from a second database (354), the second database (354) comprising entries, at least one entry associating the first suggested search query, the resource and the parameter.

[Clause 29] The method of clause 28, wherein the association of the first suggested search query, the resource and the parameter has been performed by a machine learning algorithm.

[Clause 30] The method of any one of the preceding clauses, wherein the content item is retrieved from a third database (356), the third database (356) comprising entries, each entry associating the content item with the display data, the display data comprising rich suggest content formed from web content extracted from the first resource.

[Clause 31] The method of clause 30, wherein the third database (356) is a rich suggest content database.

[Clause 32] The method of any one of the preceding clauses, wherein the display data comprises an object card.

[Clause 33] The method of any one of the preceding clauses, wherein the content item is an object card and the display data is a graphical representation of the content item.

[Clause 34] A computer-implemented method, the method comprising:

receiving, from an electronic device (302), a user input, the user input including at least two characters defining a prefix, the prefix defining at least a portion of a search query which can be submitted to a search engine;

identifying, by a processor (110), a list of suggested search queries associated with the prefix, the list of suggested search queries comprising at least a first suggested search query, a second suggested search query and a third suggested search query, the first suggested search query having been determined as more likely to be selected by the user than the second suggested search query and the third suggested search query; and upon determining, by the processor (110), that (i) the first suggested search query is associated with a content item of a first resource and (ii) the first resource associated with at least the first suggested search query is more likely to be accessed by a user than a second resource associated with at least the second suggested search query and the third suggested search query:

transmitting, prior to a completed search query associated with the prefix being submitted to the search engine, to the electronic device (302), the content item along with the list of suggested search queries.

[Clause 35] A computer-implemented method, the method comprising:

receiving, from an electronic device (302), a user input, the user input including at least two characters defining a prefix, the prefix defining at least a portion of a search query which can be submitted to a search engine;

identifying, by a processor (110), a list of suggested search queries associated with the prefix, the list of suggested search queries comprising at least a first suggested search query, a second suggested search query and a third suggested search query, the first suggested search query having been determined as more likely to be selected by the user than the second suggested search query and the third suggested search query; and upon determining, by the processor (110), that (i) the first suggested search query is associated with a content item of a first resource and (ii) the third suggested search query is associated with the content item of the first resource and (iii) the first resource associated with at least the first suggested search query and the third suggested search query is more likely to be accessed by a user than a second resource associated with the second suggested search query:

transmitting, prior to a completed search query associated with the prefix being submitted to the search engine, to the electronic device (302), the content item along with the list of suggested search queries.

[Clause 36] A computer-implemented system (316) configured to perform the method of any one of clauses 1 to 35.

[Clause 37] A non-transitory computer-readable medium (120, 130), comprising computer-executable instructions that cause a system (316), to execute the method according to any one of clauses 1 to 35.

One skilled in the art will appreciate when the instant description refers to "receiving data" from a user that the electronic device 302 or another electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method, the method comprising:

receiving, from an electronic device, a user input, the user input including at least two characters defining a prefix, the prefix defining at least a portion of a search query which can be submitted to a search engine;

identifying, by a processor, a list of suggested search queries associated with the prefix, each one of the list of suggested search queries having been ranked according to a likelihood of being selected by the user;

identifying, in the list of suggested search queries, a first plurality of suggested search queries, each one of the first plurality of suggested search queries being associated with a first resource;

a given one of the first plurality of suggested search queries having been assigned a parameter reflective of a likelihood of the first resource being selected as a result of the given one of the first plurality of suggested search queries having been submitted to the search engine;

the first plurality of suggested search queries including a top ranked suggested search query, the top ranked suggested search query being a suggested search query having been determined to be the most likely one to be selected by the user in the list of suggested search queries;

identifying, in the list of suggested search queries, a second plurality of suggested search queries, each one of the second plurality of suggested search queries being associated with a second resource;

a given one of the second plurality of suggested search queries having been assigned a parameter reflective of a likelihood of the second resource being selected as a result of the given one of the first plurality of suggested search queries having been submitted to the search engine;

calculating a first cumulative resource weight based on parameters assigned to each one of the first plurality of suggested search queries; and calculating a second cumulative resource weight based on parameters assigned to each one of the second plurality of suggested search queries;

upon determining that the first cumulative resource weight is no less than the second cumulative resource weight:

identifying display data associated with a content item associated with the first resource for transmission to the electronic device; and transmitting, prior to a completed search query associated with the prefix being submitted to the search engine, to the electronic device, the display data along with the list of suggested search queries.

2. The method of claim 1, wherein the portion of the search query corresponds to at least a portion of a search term, the search term being comprised in each one of the first plurality of suggested search queries and the second plurality of suggested search queries.

3. The method of claim 1, wherein transmitting the display data along with the list of suggested search queries further comprises causing the display, on the electronic device, of the display data in a vicinity of the top ranked suggested search query.

4. The method of claim 1, wherein transmitting the display data along with the list of suggested search queries further comprises causing the display, on the electronic device, of the display data as a block of information in a suggest list, the suggest list comprising the list of suggested search queries.

5. The method of claim 1, wherein identifying the list of suggested search queries associated with the prefix is based on an analysis of the at least two characters.

6. The method of claim 1, further comprising (1) determining whether the first resource is a navigational resource; and (2) determining whether the top ranked suggested search query is a navigational search query.

7. The method of claim 1, further comprising: in response to:
(i) the first plurality not including the top ranked suggested search query or (ii) the first cumulative resource weight being less than the second cumulative resource weight:
transmitting, prior to the completed search query associated with the prefix being submitted to the search engine, to the electronic device, the list of suggested search queries without the display data.

8. The method of claim 1, wherein, prior to identifying the list of suggested search queries associated with the prefix, the method comprises:
generating, for a given one of the first plurality of suggested search queries, a relevancy weight based on analysis of its relation to the first resource, the relevancy weight of the given one of the plurality of the first plurality of suggested search query being relied upon to generate the first cumulative weight.

9. The method of claim 1, wherein identifying the list of suggested search queries comprises accessing a first database, the first database comprising entries, at least one entry associating the prefix with at least one suggested search query.

10. The method of claim 9, wherein the prefix is associated with suggested search queries established as being the most likely to be selected by a user.

11. The method of claim 1, wherein the first database has been generated based on analysis of past search sessions from a plurality of users.

12. A computer-implemented system for processing a prefix associated with a search query, the system comprising a server, the server further comprising:
a processor; and
a network communication interface operatively coupled to the processor for communicating, via a communication network, with an electronic device executing a search application,
the processor being configured to:
receive, from the electronic device, a user input, the user input including at least two characters defining the prefix, the prefix defining at least a portion of the search query which can be submitted to the search application;
identify a list of suggested search queries associated with the prefix, each one of the list of suggested search queries having been ranked according to a likelihood of being selected by the user;
identify, in the list of suggested search queries, a first plurality of suggested search queries, each one of the first plurality of suggested search queries being associated with a first resource;
a given one of the first plurality of suggested search queries having been assigned a parameter reflective of a likelihood of the first resource being selected as a result of the given one of the first plurality of suggested search queries having been submitted to the search engine;
the first plurality of suggested search queries including a top ranked suggested search query, the top ranked suggested search query being a suggested search query having been determined to be the most likely one to be selected by the user in the list of suggested search queries;
identify, in the list of suggested search queries, a second plurality of suggested search queries, each one of the second plurality of suggested search queries being associated with a second resource;
a given one of the second plurality of suggested search queries having been assigned a parameter reflective of a likelihood of the second resource being selected as a result of the given one of the first plurality of suggested search queries having been submitted to the search engine;
calculate a first cumulative resource weight based on parameters assigned to each one of the first plurality of suggested search queries; and
calculate a second cumulative resource weight based on parameters assigned to each one of the second plurality of suggested search queries;
upon determining that the first cumulative resource weight is no less than the second cumulative resource weight:
identify display data associated with a content item associated with the first resource for transmission to the electronic device; and
transmit, prior to a completed search query associated with the prefix being submitted to the search engine, to the electronic device, the display data along with the list of suggested search queries.

13. The system of claim 12, wherein in response to (i) the first plurality not including the top ranked suggested search query or (ii) the first cumulative resource weight being less than the second cumulative resource weigh, the processor is further configured to:
transmit, prior to the completed search query associated with the prefix being submitted to the search engine, to the electronic device, the list of suggested search queries without the display data.

* * * * *